United States Patent [19]

Brunelle

[11] 4,345,062

[45] Aug. 17, 1982

[54] POLYCARBONATE TRANSESTERIFICATION WITH TETRABORATE OR TETRAALUMINATE ANION CONTAINING CATALYST

[75] Inventor: Daniel J. Brunelle, Scotia, N.Y.

[73] Assignee: General Electric Company, Schenectady, N.Y.

[21] Appl. No.: 262,287

[22] Filed: May 11, 1981

Related U.S. Application Data

[63] Continuation-in-part of Ser. No. 106,855, Dec. 26, 1979, abandoned.

[51] Int. Cl.³ ............................................. C08G 63/62
[52] U.S. Cl. .................................... 528/198; 528/199; 528/200
[58] Field of Search ....................... 528/198, 200, 199

[56] References Cited

U.S. PATENT DOCUMENTS 3,153,008  10/1964  Fox ....................................... 528/196

FOREIGN PATENT DOCUMENTS 1079822  8/1967  United Kingdom ................ 528/200

Primary Examiner—Harold D. Anderson
Attorney, Agent, or Firm—Peter A. Bielinski; James C. Davis, Jr.; Marvin Snyder

[57] ABSTRACT

An improved aromatic polycarbonate transesterification process comprising reacting a bis(aryl)carbonate and a phenol in the presence of a transesterification catalyst containing tetraborate or tetraaluminate anions, the improvement wherein the catalyst species is preformed under equilibration reaction conditions with either a phenol or a bis(aryl)carbonate prior to initiation of the transesterification reaction.

12 Claims, No Drawings

POLYCARBONATE TRANSESTERIFICATION WITH TETRABORATE OR TETRAALUMINATE ANION CONTAINING CATALYST

This application is a continuation-in-part of Ser. No. 106,855 filed Dec. 26, 1979 (now abandoned).

CROSS REFERENCE TO RELATED APPLICATIONS

This invention is related to U.S. patent applications Ser. Nos. 134,349, now U.S. Pat. No. 4,321,356, 143,804, now U.S. Pat. No. 4,329,443 and 106,856, now abandoned all of Daniel Joseph Brunelle. The above applications are assigned to the assignee of this invention. Reference is made to U.S. Ser. No. 258,124, now U.S. Pat. No. 4,330,664, which is hereby incorporated by reference.

BACKGROUND OF THE INVENTION

Field of the Invention

This invention relates to an improved aromatic polycarbonate transesterification process comprising reacting a bis(aryl)carbonate and a phenol in the presence of a transesterification catalyst containing tetraborate and/or tetraaluminate anions, the improvement wherein the catalyst species is pre-formed under equilibration reaction conditions with either a phenol or a bis(aryl)carbonate prior to initiation of the transesterification reaction.

In general, prior art including The Encyclopedia of Polymer Science, Vol. 10 (1969), Chemistry and Physics of Polycarbonates, Polymer Reviews, H. Schnell, Vol. 9, John Wiley and Sons, Inc. (1964), among other publications, including Curtius et al., Great Britain No. 1,079,822 (August 1967) reports that transesterification of aromatic diesters can be carried out in the presence of basic catalysts in the formation of high molecular weight polycarbonates.

DESCRIPTION OF THE INVENTION

This invention embodies an improved aromatic polycarbonate transesterification process comprising reacting a bis(aryl)carbonate and a phenol in the presence of a transesterification catalyst containing tetraborate and/or tetraaluminate anions, the improvement wherein the catalyst species is pre-formed under equilibration reaction conditions with either phenol or a bis(aryl)carbonate prior to initiation of the transesterification reaction.

The pre-formed basic transesterification catalyst species used in this process is defined herein as the reaction product of any (1) inorganic or organic aluminum hydride or borohydride containing an aluminum anion or boron anion wherein the anion exhibits a formal minus one ($-1$) negative valence and (2) either a phenol—optionally mono- or polyhydric or a bis(aryl)-carbonate.

Illustrative of borohydrides which can be reacted with either a phenol or a bis(aryl)carbonate to form an effective pre-formed catalyst species are hydrides of boron which have the following general structure:

$$MBH_nR_{4-n}$$

where M is selected from the class consisting of an alkali metal, an alkaline earth metal, a quaternary hydrocarbon ammonium, a quaternary hydrocarbon phosphonium and a tertiary hydrocarbon sulfonium group, n is a number of from 1 to 4, and R is a hydrocarbon and hydrocarbonoxy group.

Also, illustratively, quaternary ammonium, quaternary phosphonium, and tertiary sulfonium groups have the following general structures, respectively, $$R'_4N, R'_4P, \text{ and } R'_3S$$

wherein R' is a hydrocarbon group, e.g., alkyl, aryl, cycloalkyl, etc. including mixtures thereof.

In a presently preferred embodiment, the catalyst pre-form is derived from a quaternary alkyl ammonium tetrahydridoborate having the formula:

$$R'_4NBH_4$$

where R' is a $C_{1-4}$ alkyl group, i.e., an alkyl group which contains 1 to 4 carbon atoms. Even more preferred is tetramethylammonium tetrahydridoborate—also commonly referred to as tetramethylammonium borohydride.

Illustrative of aluminum hydrides which can be reacted either alone or in combination with either a phenol or a bis(aryl)carbonate to form another, less preferred, but effective catalyst species are hydrides of aluminum which have the following general structure:

$$MAlH_nR_{4-n}$$

wherein M, n and R are the same as described above with respect to the borohydride formula.

In another embodiment of this invention, the catalyst pre-form is derived from an alkali metal tetrahydridoaluminate having the formula:

$$MAlH_4$$

wherein M is selected from lithium and sodium. Even more preferred is lithium tetrahydridoaluminate—also commonly referred to as lithium aluminum hydride.

The general class of inorganic or organic hydrides which contain aluminum hydride or boron hydride groups which exhibit a negative minus one valence are known to those skilled in the art and can be prepared by any method including methods referred to in the following publication "Hydrogen Compounds of Metallic Elements", General and Industrial Chemistry Series, K. M. Mackay, E. & F. N. Spon, Ltd., publisher (1966) Great Britain.

The monohydric phenol reactants commonly referred to as aromatic monohydroxy compounds are well known and include illustratively, those described by Vestergaard in U.S. Pat. No. 3,989,672 col. 4, line 27-31. Presently preferred monohydric phenols include phenol, i.e. hydroxybenzene, cyclohexanol, the paratertiarybutylphenol, parabromophenol, etc. Especially preferred is monohydroxybenzene, i.e. phenol.

The dihydric phenols reactants commonly referred to as aromatic dihydroxy compounds are also well-known and include illustratively, those described by Fox's Formula II in U.S. Pat. No. 3,153,008, column 2, lines 23-72 and column 3, lines 1-42. Presently preferred dihydric phenols are of the formula:

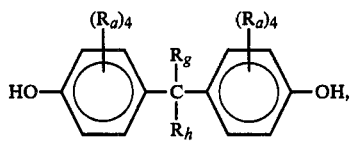

where $R_a$ is selected from hydrogen, $C_{1-4}$ alkyl, methoxy, bromine and chlorine, $R_g$ and $R_h$ are hydrogen or a $C_{1-30}$ monovalent hydrocarbon group. Specific examples follow:

4,4'-dihydroxy-diphenyl-1,1-butane;
4,4'-dihydroxy-diphenyl-2-chlorophenyl methane;
4,4'-dihydroxy-diphenyl-2,2-propane also known as bis(4-hydroxyphenyl)propane-2,2.
4,4'-dihydroxy-3-methoxy-diphenyl-2,2-propane;
4,4'-dihydroxy-3-isopropyl-diphenyl-2,2-propane;
4,4'-dihydroxy-diphenyl-2,2-nonane;
4,4'-dihydroxy-2,2'-dimethyl-5,5'-di-tert-butyl-diphenyl methane
4,4'-dihydroxy-3,3'-5,5'-tetrachloro-diphenyl-2,2-propane; and
4,4'-dihydroxy-3,3',5,5'-tetrabromo-diphenyl-2,2-propane.

The bis(aryl)carbonates reactants also commonly referred to as carbonic acid aromatic diesters are well-known and include illustratively those described by Fox's Formula III in U.S. Pat. No. 3,163,008, column 2, lines 23–72 and column 3, lines 1–42. Presently preferred bis(aryl)carbonates include diphenyl carbonate, dicresyl carbonate, bis(2-chlorophenyl)carbonate, the bis-phenyl carbonates of hydroquinone, resorcinol and 4,4'-dihydroxy-diphenyl, the bis-phenyl carbonates of the bis(4-hydroxyaryl)-alkanes, -cycloalkanes, ethers, sulfides, sulfones, etc.

In general the reaction parameters followed in the pre-form catalyst process sequence step comprise (1) temperatures of from about 25° C. to about 250° C., preferably 50° C. to 150° C., and optionally (2) inert atmospheres, and/or (3) reduced pressures. Illustratively, the catalyst pre-form process sequence comprises a liquid phase equilibration reaction of an aluminum and/or borohydride with either a phenol or a bis(aryl)carbonate at elevated temperatures up to less than about 200°–250° C. preferably, in an inert nitrogen atmosphere and/or under vacuum. Optionally, and frequently preferably in order to carry out the equilibration at temperatures lower than the melt temperatures of the phenols or the bis(aryl)carbonates, inert solvents, e.g. ethers, are used during the equilibration reaction.

Pre-formed catalyst reactions are illustrated by the following general equations—furnished for illustrative purposes only—since the reaction mechanisms involved may be more complex:

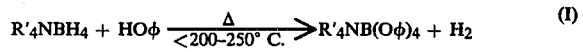  (I)

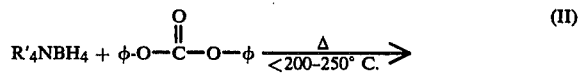

$$R'_4NBH(O\phi)_2(OCH_3) \quad (II)$$

where R' is as described above, and $\phi$ represents a phenyl group, e.g. 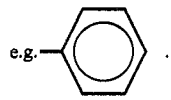

The upper process temperature limitation of less than about 200°–250° C. is employed in the preparation of the pre-formed catalyst since it is believed that the effective catalyst species contains a tetraborate or tetraaluminate anion which exhibits a formal negative −1 valence and that at temperatures above about 200°–250° C. the effective catalyst species is deactivated as a result of the temperature dependent reaction described by equation (III).

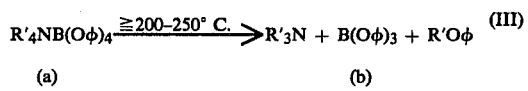

(a)       (b)

wherein the R' and $\phi$ are the same as described above. As illustrated by the above equation, the shift in equilibrium from a tetraborate to a triborate at temperatures in excess of 200°–250° C. removes from the reaction environment the essential tetraborate catalyst species.

Illustratively, the improved aromatic polycarbonate transesterification process of this invention entails the reaction of bis(aryl)carbonates and dihydric phenols in the presence of a pre-formed transesterification catalyst containing tetraborate or tetraaluminate anions carried out in accordance with the following process sequence and process parameters:

(1) reacting at a temperature less than about 200°–250° C. a borohydride of the general formula:

and/or an aluminum hydride of the formula:

wherein M, R and n are the same as described herein before in solution in a phenol to form a pre-form catalyst of the general formulas:

wherein x is an integer at least a whole number less than n, (2) adding and reacting bis(aryl)carbonates and dihydric phenols at elevated temperatures and reduced pressures to form a high molecular weight aromatic polycarbonate.

In another embodiment of this invention, the transesterification process entails the following process sequence and process parameters:

(1) reacting at a temperature less than about 200°–250° C. a borohydride and/or an aluminum hydride of the formulas:

wherein M, n and R are as defined above in solution in a bis(aryl)carbonate to form a pre-form catalyst of the general formulas:

$$MB(OR'')_x(OR''')_{4-x}$$

and/or $$MAl(OR'')_x(OR''')_{4-x}$$

wherein R" and R''' are the same as defined above and the value of x is a whole number or an integer at least a whole number less than n, and (2) adding and reacting bis(aryl)carbonates and dihydric phenols at elevated temperatures and reduced pressures to form a high molecular weight aromatic polycarbonate.

In general in process step (1), described above, any amount of inorganic or organic aluminum or borohydride on a mole ratio basis can be combined with either the bis(aryl)carbonate or the phenol. Illustratively, the hydride to bis(aryl)carbonate or phenol mole ratios can be within the range of from about 0.01:1 to about 10:1, however preferably at least sufficient amounts of either bis(aryl)carbonate or phenols are combined to provide sufficient phenoxy anion groups to displace substantially all of the hydride ions, $H^\ominus$, associated with the aluminum or borohydride reactants.

In general in process sequence step (2), described above, effective mole ratios of tetraborate or tetraaluminate to dihydric phenols are within the range of from $1 \times 10^{-6}$ to 1 to 1:1 preferably from $1 \times 10^{-4}$ to about 0.02:1, and more preferably from about $1 \times 10^{-3}:1$ to 0.1:1.

In general optimum reactions parameters in process sequence step (2) described above, include (A) transesterification reaction temperatures of 80° C. to 300° C., preferably 100° C. to 230° C., (B) inert atmospheres and/or (C) reduced pressures. Illustratively in the preparation of high molecular weight aromatic polycarbonate, the transesterification process sequence step (2) preferably comprises substantially continuous removal of any volatile by-products, e.g. mono-hydric phenols, ethers, amines, alcohols, aldehydes, hydrogen, etc. at elevated temperatures up to about 200°–300° C. while continuously decreasing the pressure to values as low as 1–0.1 mm. Hg. vacuum.

The best mode of practicing this invention is set out in the examples hereafter.

EXAMPLES 1–8

A series of bisphenol-A, e.g. bis(4-hydroxyphenyl)-propane-2,2 polycarbonates were transesterified by reacting 1.00 mole equivalents of bis(4-hydroxyphenyl)-propane-2,2 (i.e. BPA) with 1.067 mole equivalents of diphenylcarbonate in the presence of the mole equivalents of pre-formed catalysts noted in Table II. The reactions were carried out in a 25×200 mm. test tube having a side arm for vacuum evaporation of by-product monohydric phenol. The process temperature-pressure sequence is described in Table I. The pre-formed metal hydride type including the amount of catalyst contained by the pre-form on an absolute basis, i.e. total amount to metal hydride to total amount of BPA used in the transesterification reaction, as well as the properties of the resulting polycarbonates are described in Table II.

The preformed catalysts of Examples 2–4, and 6–8, were prepared by mixing 1.00 mole equivalent of metal hydride with 4.0 mole equivalents of diphenylcarbonate or BPA, using a mortar and pestle, heating to a homogeneous melt under nitrogen, cooling and grinding the resulting solid to form a fine solid powder. The $LiAlH_4 \cdot Ph_2CO_3$ and BPA pre-formed catalysts of Examples 1 and 5 were prepared by dissolving the ingredients of the same relative proportions in ether, evaporating the ether, cooling and grinding to form a powder.

TABLE I

| BPA-Polycarbonate Reaction Parameter Sequence | | | |
|---|---|---|---|
| Total Reaction Time/hr. | Time Interval/hr. at following: | Temp.°C. | and Pressure Hg. |
| 0.75 | 0.75 | 25–160 | 40–45 |
| 1.75 | 1.0 | 160–210 | 1 mm |

TABLE II

| | | BPA-Polycarbonate Reaction Product | | |
|---|---|---|---|---|
| Example No. | Catalyst Candidate (0.1 mole %)[1] | Yield[2] | Color[3] | $MW_w$[4] |
| 1 | $LiAlH_4 \cdot Ph_2CO_3$ | 99 | colorless | 12,700 |
| 2 | $Me_4NBH_4 \cdot Ph_2CO_3$ | 100 | colorless | 11,600 |
| 3 | $LiBH_4 \cdot Ph_2CO_3$ | 100 | colorless | 11,000 |
| 4 | $NaBH_4 \cdot Ph_2CO_3$ | 100 | colorless | 10,000 |
| 5 | $LiAlH_4 \cdot BPA$ | 96 | colorless | n.d.[5] |
| 6 | $Me_4NBH_4 \cdot BPA$ | 97 | colorless | 6,600 |
| 7 | $LiBH_4 \cdot BPA$ | 99 | colorless | n.d.[5] |
| 8 | $NaBH_4 \cdot BPA$ | 99 | colorless | 6,600 |

[1] = Mole % based on mole BPA.
[2] = Yield based upon bisphenol-A polycarbonate recovered after precipitation from methanol after drying at 100° C. under 20 mm Hg. for 24–48 hours.
[3] = The color of the product was recorded at the end of the reaction while still retained in the reactor evaporator.
[4] = GPC wt. avg. MW, rel. to polystyrene.
[5] = n.d. = not determined.

EXAMPLES 9–13

Another transesterification series was conducted in a manner similar to the general process of Table I—except that the reaction was carried out under a nitrogen atmosphere in accord with the process-temperature sequence described in Table III. The catalysts and polycarbonates are characterized in Table IV in the same manner as Table II.

TABLE III

| BPA-Polycarbonate Reaction Parameter Sequence | | | |
|---|---|---|---|
| Total Reaction Time/hr. | Time Interval/hr. at following: | Temp.°C. | and Pressure Hg. |
| 1.0 | 1.0 | 25–260 | atm. |
| 2.0 | 1.0 | 260 | 100 mm |
| 2.5 | 0.5 | 260 | 40–45 mm |
| 3.0 | 0.5 | 260–210 | 1 mm |

TABLE IV

| | | BPA-Polycarbonate Reaction Product | | |
|---|---|---|---|---|
| Example No. | Catalyst Candidate (0.1 mole %)[1] | Yield[2] | Color[3] | $MW_w$[4] |
| 9 | $Me_4NBH_4 \cdot Ph_2CO_3$ | 100 | colorless | 7,050 |
| 10 | $LiBH_4 \cdot Ph_2CO_3$ | 102 | lt. lemon or flesh | 8,200 |
| 11 | $NaBH_4 \cdot Ph_2CO_3$ | 94 | colorless | 7,700 |
| 12 | $NaBH_4 \cdot BPA$ | 99 | lemon | 9,600 |
| 13 | Control-no catalyst | 86 | colorless | 2,300 |

Footnotes [1-5] same as Table II footnotes.

As illustrated the aluminumhydride and boronhydride catalyst species of Tables II and IV generally provide polycarbonates of high molecular weight having essentially colorless characteristics in high yields, especially where the transesterification process sequence of Table I is followed. The polycarbonates prepared with the pre-formed metal hydride: bis(aryl)carbonates catalyst class described by the data of Examples 1-4, Table II illustrate the enhanced catalyst efficacy of the pre-formed metal hydride: bis(aryl)carbonate catalyst.

The aromatic polycarbonates derived from this process, preferably, exhibit an intrinsic viscosity of at least 0.3, and more preferably from about 0.5 to about 1.5 or even higher, deciliters per gram (dl./g.) as measured in either methylene chloride or chloroform or similar solvent systems at 25° C. Especially useful polycarbonates generally have intrinsic viscosities within the range of from about 0.38 to about 0.7 dl./g. The polycarbonates generally have a number-average molecular weight of at least about 1000, preferably 5000, and more preferably from about 10,000 to about 50,000 or higher. Polycarbonates of such molecular weight characteristics process easily between about 450° F. and 650° C., and are generally suitable raw materials for the manufacture of filaments, fibers, films, sheets, laminates, and other thermoplastic articles of manufacture including reinforced articles employing conventional molding, extruding, etc., manufacturing techniques.

What is claimed is:

1. In a process for preparing a high molecular weight polycarbonate by reacting at least one bis(aryl)carbonate with at least one dihydric phenol in the presence of a transesterification catalyst containing tetraborate or tetraaluminate anions, the improvement comprising carrying out the process in accordance with the following sequence and parameters:

(1) reacting at a temperature less than about 250° C.
    (i) a borohydride of the general formula:

$MBH_nR_{4-n}$ or an aluminum hydride of the formula:

$MAl_nHR_{4-n}$ wherein M is selected from the class consisting of an alkali metal, an alkaline earth metal, a quaternary hydrocarbon ammonium, a quaternary hydrocarbon phosphonium and a tertiary hydrocarbon sulfonium group, n is a number of from 1 to 4, and R is a hydrocarbon or hydrocarbonoxy group,
    (ii) with a phenol or a bis(aryl)carbonate to form a pre-formed catalyst of the general formulas:

$MBH_xR_{4-x}$ $MAlH_xR_{4-x}$ $MB(OR'')_x(OR''')_{4-x}$ or $MAl(OR'')_x(OR''')_{4-x}$ wherein x is integer at least a whole number less than n, R''' is an aryl group, and R'' is an alkyl group, and
  (2) adding and reacting at least one bis(aryl)carbonate and at least one dihydric phenol at elevated temperatures and reduced pressures to form high molecular weight aromatic polycarbonate.

2. The claim 1 process wherein the sequence step (1) the borohydride has the structural formula $[R'_4N]BH_nR_{4-n}$ wherein each R' is an alkyl group containing from 1 to 4 carbon atoms, and n is a number of from 1 to 4, and the phenol is monohydroxybenzene.

3. The claim 1 process wherein the sequence step (1) the borohydride has the structural formula $[R'_4N]BH_nR_{4-n}$ wherein R' is an alkyl group containing from 1 to 4 carbon atoms, and n is a number of from 1 to 4, and the phenol is bis(4-hydroxyphenyl)propane-2,2.

4. The claim 1 process wherein the sequence step (1) the borohydride has the structural formula $[R'_4N]BH_nR_{4-n}$ wherein each R' is an alkyl group containing from 1 to 4 carbon atoms, and n is a number of from 1 to 4, and the bis(aryl)carbonate is diphenyl carbonate.

5. The claim 1 process wherein the sequence step (1) the aluminum hydride has the structural formula $MAlH_nR_{4-n}$ wherein M is an alkali metal, and n is a number of from 1 to 4, and the phenol is monohydroxy benzene.

6. The claim 1 process wherein the sequence step (1) the aluminum hydride has the structural formula $MAlH_nR_{4-n}$ wherein M is an alkali metal, and n is a number of from 1 to 4, and the phenol is bis(4-hydroxyphenyl)propane-2,2.

7. The claim 1 process wherein the sequence step (1) the aluminum hydride has the structural formula $MAlH_nR_{4-n}$ wherein M is an alkali metal, and n is a number of from 1 to 4, and the bis(aryl)carbonate is diphenyl carbonate.

8. The claim 3 process wherein the sequence step (1) the borohydride is quaternary methyl ammonium borohydride having the structural formula $(CH_3)_4NBH_4$.

9. The claim 4 process wherein the sequence step (1) the borohydride is quaternary methyl borohydride having the structural formula $(CH_3)_4NBH_4$.

10. The claim 5 process wherein the sequence step (1) the aluminum hydride is lithium aluminum hydride having the structural formula $LiAlH_4$.

11. The claim 6 process wherein in the sequence step (1) the aluminum hydride is lithium aluminum hydride having the structural formula $LiAlH_4$.

12. The claim 7 process wherein in the sequence step (1) the aluminum hydride is lithium aluminum hydride having the structural formula $LiAlH_4$.

* * * * *